(12) United States Patent
Schwarzkopf

(10) Patent No.: US 8,348,567 B2
(45) Date of Patent: Jan. 8, 2013

(54) PLASTIC RIVET AND ASSEMBLY TOOL

(75) Inventor: Nikolaus Schwarzkopf, Lehre (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 916 days.

(21) Appl. No.: 12/089,218

(22) PCT Filed: Oct. 10, 2006

(86) PCT No.: PCT/IB2006/002828
§ 371 (c)(1),
(2), (4) Date: Apr. 4, 2008

(87) PCT Pub. No.: WO2007/042911
PCT Pub. Date: Apr. 19, 2007

(65) Prior Publication Data
US 2008/0240882 A1    Oct. 2, 2008

(30) Foreign Application Priority Data

Oct. 12, 2005 (DE) ..................... 20 2005 016 022 U

(51) Int. Cl.
*F16B 13/06* (2006.01)
(52) U.S. Cl. .............................. 411/45; 411/41; 411/913
(58) Field of Classification Search ............... 411/41, 411/45–48, 508–510, 913, 441; 24/297; 81/44, 176.2, 436
See application file for complete search history.

(56) References Cited

U.S. PATENT DOCUMENTS 239,265 A * 3/1881 Musselman ..................... 81/44
(Continued)

FOREIGN PATENT DOCUMENTS

CA          855914         11/1970
(Continued)

OTHER PUBLICATIONS

International Search Report for PCT/IB2006/002828 mailed Feb. 6, 2007.

*Primary Examiner* — Roberta Delisle
(74) *Attorney, Agent, or Firm* — Lowe Hauptman Ham & Berner LLP

(57) ABSTRACT

A molded plastic rivet for affixing two parts to each other when the rivet is inserted through two mutually aligned apertures in the parts. The rivet includes a pin having a pin head, a pin shank and first and second pin latching offsets at the distal end of the pin shank. The latching elements include at least first latching offsets. The rivet also includes a rivet body having a rivet body head, and a rivet body shank that is insertable in the apertures and comprises several legs running away from the head of the rivet body, these legs being joined to each other distally into a nose tapering toward the longitudinal axis of the rivet body, a passage being formed between the legs and passing through the head of the rivet body, each leg being fitted at a distal end thereof with a first locking surface element facing the passage for engaging the first latching offsets of the pin once the pin has been driven completely into the rivet body, where, in a pre-assembled state, the pin shank is partly insertable into said passage, the legs running radially outward to the rivet body's longitudinal axis, each leg being fitted at a proximal end thereof with a second locking surface element engageable with the first latching offsets of the pin in the pre-assembled state, wherein approximately diametrically opposite protrusions are configured on the side of the head of the rivet body at regions opposite the shank of the rivet body and are fitted with recesses or apertures for receiving respective arms of a fork-shaped assembly tool.

6 Claims, 2 Drawing Sheets

U.S. PATENT DOCUMENTS

| | | | | |
|---|---|---|---|---|
| 3,606,814 | A | * | 9/1971 | MacKenzie .................. 411/80.2 |
| 5,695,307 | A | * | 12/1997 | Takahashi ..................... 411/508 |
| 5,775,860 | A | * | 7/1998 | Meyer ............................ 411/46 |
| 6,481,942 | B2 | * | 11/2002 | Tanaka ........................... 411/45 |
| 6,533,515 | B2 | * | 3/2003 | Meyer ............................. 411/45 |
| 7,105,119 | B2 | * | 9/2006 | Kanie et al. .................. 264/238 |
| 7,243,401 | B2 | * | 7/2007 | Sawatani ........................ 24/297 |
| 7,607,875 | B2 | * | 10/2009 | Shinozaki et al. .............. 411/45 |
| 2002/0001513 | A1 | * | 1/2002 | Tanaka ........................... 411/45 |

FOREIGN PATENT DOCUMENTS

GB           2264081        8/1993

* cited by examiner

PLASTIC RIVET AND ASSEMBLY TOOL

RELATED APPLICATIONS

The present application is based on, and claims priority from, German Application Number 20 2005 016 022.9, filed Oct. 12, 2005, the disclosure of which is hereby incorporated by reference herein in its entirety.

BACKGROUND

The present invention relates to a plastic rivet affixing parts to each other and to an inserting tool for the plastic rivet.

U.S. Pat. No. 5,775,860, which is incorporated by reference herein in its entirety, discloses a plastic rivet of which the body comprises a flange-shaped head, further legs joined to the head which converge into a nose. The legs run outwardly from each other so that, once inserted into a hole, they may grip from behind the edge of said hole at its distal insertion side. The head comprises a passage to pass an inserted pin in turn fitted with its own head. Preferably the pin molded integrally with the shank. First latching offsets, also second latching offsets spaced apart from and opposite to said first ones, are integral with the said pin. These latching offsets cooperate with first and second locking surface elements inside the head's passage or at the legs' insides. When in the pre-assembled position, the distally situated first latching offsets act from behind on the locking surface elements in the shank's head. After the pin has been forced all the way between the said legs, the first latching offsets act from behind on second locking surface elements at the insides of the legs, the second latching offsets—which are configured closer to the head of the said pin—engaging from behind the first locking surface elements in the head's passage. In this manner the pin shall be doubly locked in the rivet body. Once the pin has been inserted, the elastically deforming legs no longer can be displaced radially toward each other and consequently the rivet no longer may be pulled out of the hole into which it was inserted.

On occasion such a plastic rivet must be used at difficult-to-reach locations. Accordingly it is the objective of the present invention to develop further a plastic rivet of the initially discussed kind so that it allows being inserted in problem-free manner into a part's hole when using an appropriate tool.

SUMMARY

In the present invention, the shank head comprises, on the side opposite the shank, diametrically opposite protrusions fitted with recesses or apertures to receive the arms of a fork-like assembling tool. Preferably the recesses are open away from the pin. The fork arms preferably are mutually parallel and they engage said recesses. In this manner the plastic rivet can be gripped by a tool by means of which it can be mounted at a place inaccessible to the fingers.

Said protrusions' recesses also may be replaced by boreholes or axially parallel apertures receiving the fork arms. Preferably the fork arms frictionally engage the recesses or apertures to preclude the plastic rivet from slipping off the tool. On the other hand the tool should be easily removed from the plastic rivet after its insertion.

The tool inserting the plastic rivet of the present invention comprises a handle, a shank and a fork segment at the free shank end. The shank subtends an obtuse angle with handle axis and the fork arms are situated in a plane which in turn subtends an obtuse angle with the shank axis. Accordingly plane of the fork arms is spaced away from the handle. Consequently the plastic rivet may be used and inserted in a relatively confined space using the said tool while the handle can be seized, and the tool can be guided, in unhampered manner.

BRIEF DESCRIPTION OF DRAWINGS

The present invention is elucidated below in relation to the appended drawings.

DETAILED DESCRIPTION OF EMBODIMENTS

Figure 1:
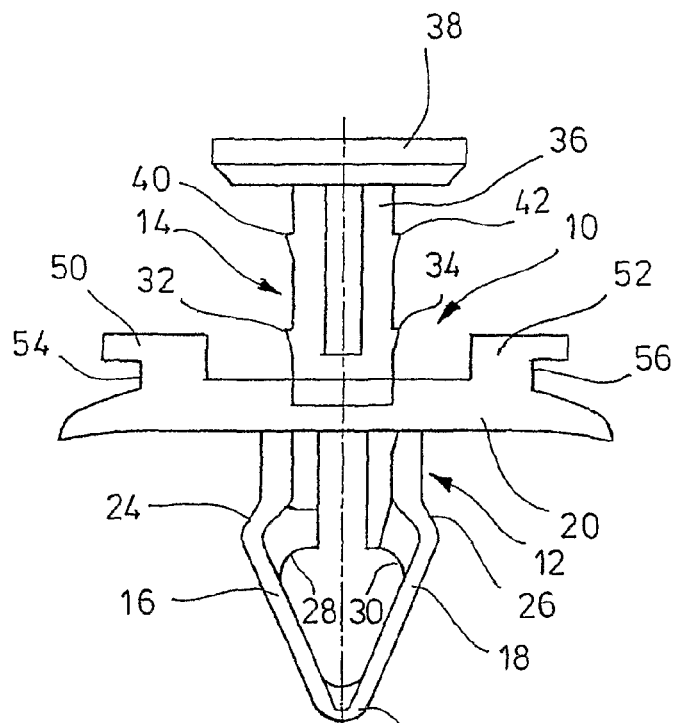
FIG. 1 is a sideview of the plastic rivet of the invention.
Figure 2:
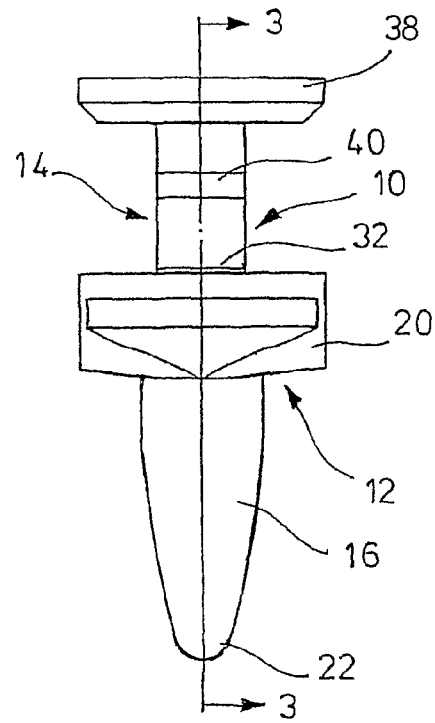
FIG. 2 shows a sideview of the plastic rivet of FIG. 1 rotated by 90°.
Figure 3:
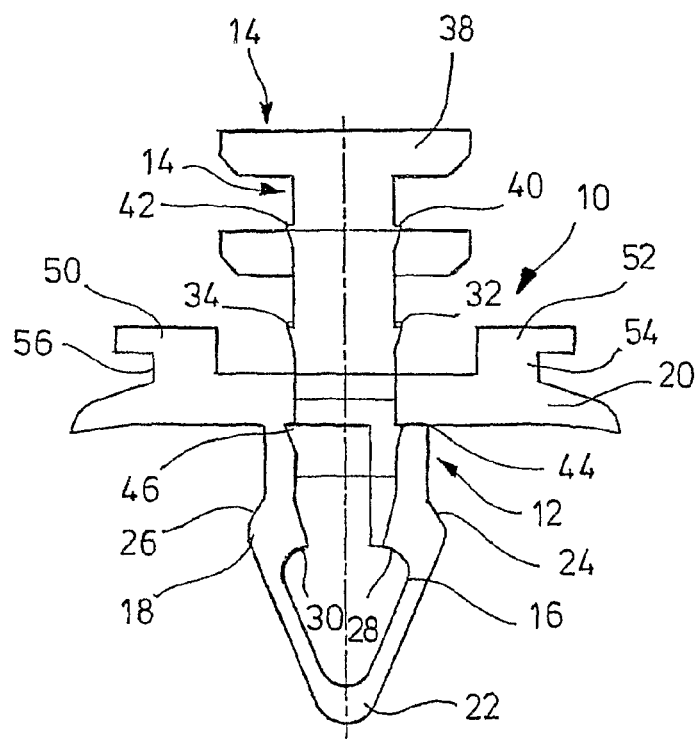
FIG. 3 shows a plastic rivet of FIG. 1 in a position rotated by 180°.

A plastic rivet 10 as shown in FIGS. 1 through 3 comprises a rivet body 12 and a pin 14. The body 12 in turn comprises a shank having two legs 16, 18 that initially run approximately parallel to one another underneath an elongated, flange-shaped head 20, and then diverge, and thereupon converge again into a nose 22. Such a plastic rivet shank geometry is already approximately known from the aforementioned U.S. Pat. No. 5,775,860. In this manner the legs 16, 18 constitute respective, rear-engaging segments 24 and 26 that grip the edge of a hole from the rear when the shank is inserted into the hole of an omitted component. The legs are fitted at the inside with locking surface elements 28, 30 running toward the shank axis. Underneath the relief shapes 24, 26, the legs 16, 18 are V-shaped to facilitate insertion into a part's borehole or aperture. The locking surface elements 28, 30 cooperate with first latching offsets 32, 34 at a shank 36 of the pin 14. The latching offsets 32, 34 are configured diametrically mutually opposite. Second mutually opposite latching offsets 40, 42 are constituted closer to the head 38 of the pin 14.

Initially the rivet body 12 and the pin 14 are integrally injection molded, however they are joined to allow breaking them apart. When in the pre-assembly position, the pin 14 will be driven into the rivet body 12 as shown in dashed lines in FIG. 3. In this process the offsets 32, 34 cooperate with the locking surface elements 44, 46 and keep the pin in its pre-assembled position. Next the rivet body is inserted into the workpiece aperture. Thereupon force is applied to the pin which is driven thereby into the rivet body 12 between the legs 16, 18. In this procedure the latching offsets 32, 34 grip underneath the locking surface elements 28, 30, and the second latching offsets 40, 42 grip underneath the locking surface elements 44, 46 in the passage of the head 20.

As shown in FIGS. 1-3, the head 20 is oblong. It is slightly curving downward at its ends to cooperate with the associated areas of the part involved and therefore stresses latter. At its top side, the head 20 is fitted at the ends of its longer axis with protrusions 50, 52 designed as hooks or the like and comprising recesses 54, 56 open away from each other and of which the innermost bases are a specified distance apart.

Figure 4:
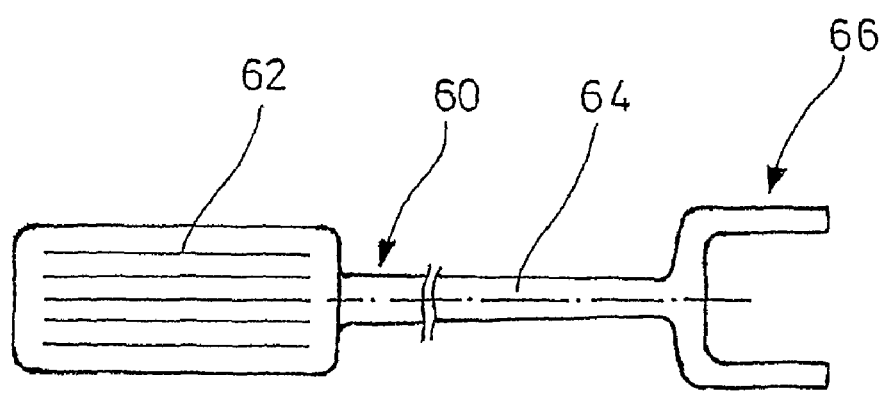
FIG. 4 is the sideview of a tool of the invention.
Figure 5:
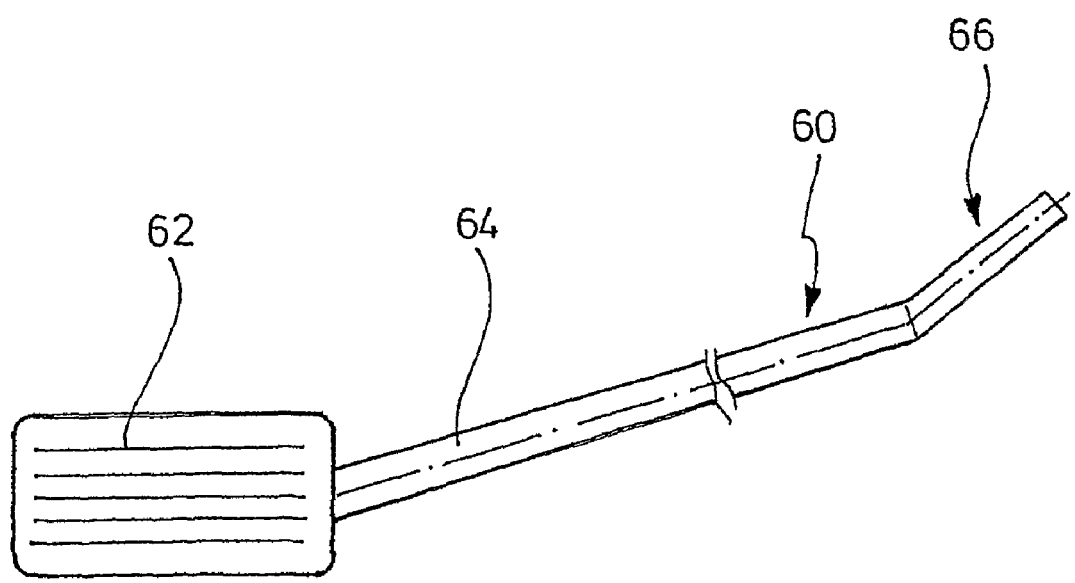
FIG. 5 shows a sideview of the tool of FIG. 4 rotated by 90°.

FIGS. 4 and 5 show an assembly tool 60 comprising an elongated handle 62, a longer shank 64 and a fork segment 66. As indicated in FIG. 5, the axis of the shank 64 subtends an obtuse angle with the axis of the handle 62. The plane subtended by the arms of the fork segment 66 also subtends an obtuse angle with the axis of the shank 64.

The insides of the fork arms are apart by a distance such that said arms can be inserted with slight friction into the recesses 54, 56. In this manner the plastic rivet can be kept in its pre-assembly position against the tool 60 and then be installed.

The invention claimed is:

1. In combination, a fork-shaped assembly tool and a plastic rivet, said plastic rivet comprising:
   a pin, wherein the pin includes a pin head, a pin shank and pin latching elements at a distal end of the pin shank, wherein the latching elements include at least first latching offsets, and
   a rivet body fitted with an oblong rivet body head having downwardly curving ends, and a rivet body shank insertable in a component aperture, said rivet body shank comprises a plurality of legs running away from the rivet body head, said plurality of legs being joined to each other distally into a nose tapering toward the longitudinal axis of the rivet body shank, a duct being formed between two of said plurality of legs of the rivet body shank and passing through said rivet body head, each elongated leg being fitted at its distal end with a first locking surface element pointing to said duct engaging the first latching offsets of the pin once the pin has been driven completely into the rivet body,
   wherein said fork-shaped assembly tool comprises a shank and a pair of opposing arms extending from said shank,
   wherein, the pin shank is partly insertable into said duct, the plurality of legs running radially outward to the rivet body's longitudinal axis, second locking surface elements of the duct being proximally configured and are engageable with the first latching offsets of the pin when in the pre-assembled state,
   and wherein approximately diametrically opposite protrusions are configured on the side of the oblong rivet body head which is opposite said rivet body shank and are fitted with recesses or apertures configured to receive said pair of opposing arms of said fork-shaped assembly tool, whereby said rivet body is friction-held in place against said pair of opposing arms of the fork-shaped assembly tool during assembly.

2. The plastic rivet as claimed in claim 1, wherein the recesses are open on the side away from the pin.

3. The plastic rivet as claimed in claim 1, wherein the protrusions each comprise an aperture of which the axes are mutually parallel.

4. The plastic rivet as claimed in claim 1, wherein the protrusions are configured on the longer axis of the oblong rivet body head.

5. A tool to assemble a plastic rivet as claimed in claim 1, characterized in that it comprises a handle, further a shank and a fork segment at the free end of the shank, in that the axis of the handle subtends an obtuse angle with the axis of the shank, the handle being situated a distance away from the plane subtended by the fork arms.

6. Tool as claimed in claim 5, characterized in that the fork arms may be inserted while incurring friction into the recesses or apertures of the protrusions.

* * * * *